United States Patent [19]

Tezuka

[11] Patent Number: 4,852,267
[45] Date of Patent: Aug. 1, 1989

[54] COORDINATE MEASURING MACHINE HAVING A GUIDE SECTION FOR A COLUMN OF A MEASURING MEMBER SUPPORT BODY

[75] Inventor: Kazusaku Tezuka, Kawachi, Japan

[73] Assignee: Mitutoyo Corporation, Tokyo, Japan

[21] Appl. No.: 180,765

[22] Filed: Apr. 12, 1988

[30] Foreign Application Priority Data

Jul. 31, 1987 [JP] Japan ................... 62-192335

[51] Int. Cl.[4] .................... G01B 5/03; G01B 7/03
[52] U.S. Cl. ...................... 33/503; 33/1 M
[58] Field of Search ............... 33/503, 1 M, 504, 505

[56] References Cited

U.S. PATENT DOCUMENTS 4,682,418 7/1987 Tuss et al. ................... 33/503
4,727,653 3/1988 Fujitani et al. ............... 33/1 M
4,741,112 5/1988 Band et al. ................... 33/503

Primary Examiner—Harry N. Haroian
Attorney, Agent, or Firm—Oliff & Berridge

[57] ABSTRACT

In a coordinate measuring machine, a Y-axis guide section is formed at one lateral end of a table for placing a work and consisting of a first lower flat guide surface formed in parallel to the upper surface of the table and two parallel vertical guide surfaces formed respectively on the opposite sides of the first lower flat guide surface, both extend in the direction of movement of a measuring member support body. A second lower flat guide surface is formed at the other lateral end of the table in parallel to the upper surface of the table. Vertical position of the measuring member support body relative to the table on the side of the Y-axis guide section is regulated by using the upper surface of the table and the first lower flat surface. Horizontal position of the measuring member support body relative to the table is regulated by using the two parallel vertical guide surfaces. Another vertical position of the measuring member support body relative to the table on the other side of the Y-axis guide section is regulated by using the upper surface of the table and the second lower flat guide surface.

8 Claims, 6 Drawing Sheets

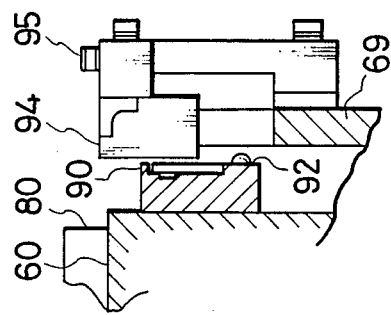
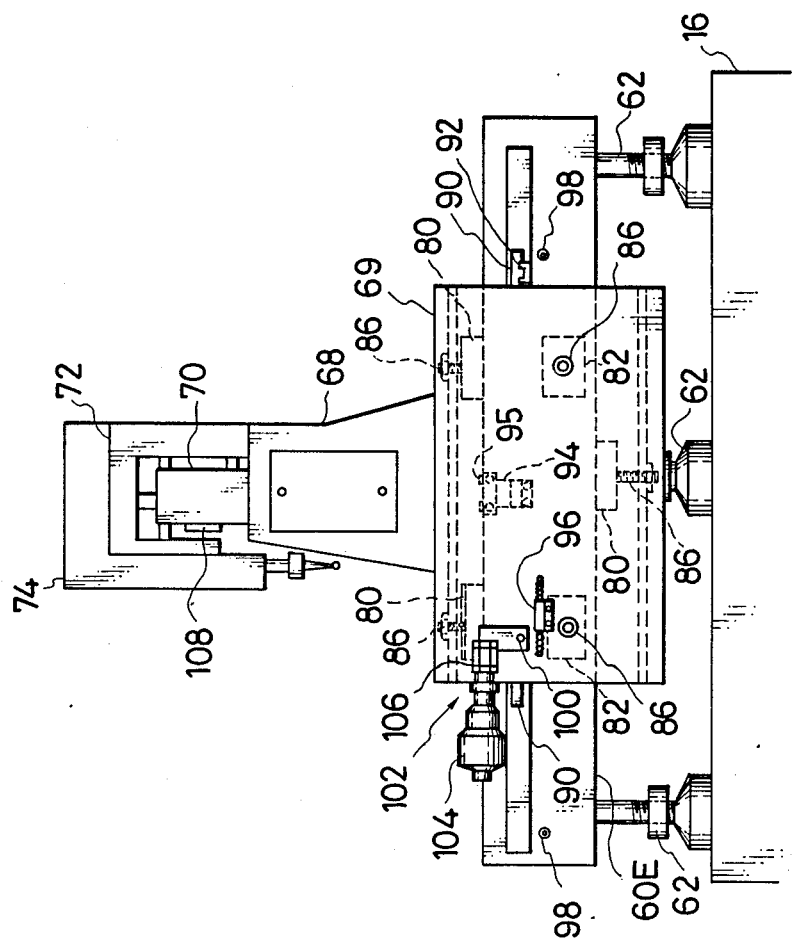

COORDINATE MEASURING MACHINE HAVING A GUIDE SECTION FOR A COLUMN OF A MEASURING MEMBER SUPPORT BODY

BACKGROUND OF THE INVENTION

1. Field of the Invention

The present invention relates to a two-dimensional or three-dimensional coordinate measuring machine for measuring the size and shape of a work placed on a table from the displacement of a measuring member which is moved in multidimensional directions and contacted with the work and, more particularly, to a coordinate measuring machine which needs no mechanism for interconnecting opposite lower ends of a bridge-shaped measuring member support body under the table. 2. Description of the Prior Art The coordinate measuring machine for measuring the size and shape of a work has widely been used in various industrial fields owing to its high measuring accuracy and measuring efficiency. A conventional coordinate measuring machine comprises a table having an upper surface for placing a work thereon, a bridge-shaped measuring member support body extending over the table and capable of moving relative to the table, and a measuring member supported by the measuring member support body, in which the measuring member is moved in multidimensional directions and contacted with the work placed on the table, and the size and shape of the work is measured from the displacement of the measuring member.

FIG. 7 illustrates an example of a conventional three dimensional coordinate measuring machine having a fixed table 10 and a movable measuring member 12. This conventional three-dimensional coordinate measuring machine comprises a table 10 having an upper surface 10A for placing a work thereon, a bridge-shaped measuring member support body 14 having a bridge-shaped crossing over the table 10 and movable in a direction of Y-axis respective to the table 10, and a measuring member 12 supported on the measuring member support body 14.

The table 10 is mounted on a base 16.

The measuring member support body 14 comprises a left column 18, a right column 20, a crossmember 22 which is across the table 10 along X-axis and extends over the upper portions of columns 18 and 20, and X-axis slider 24 movably mounted on the crossmember 22 along the X-axis, and a spindle 26 movably mounted on the X-axis slider 24 along vertical direction of the upper surface 10A of the table 10, namely, along Z-axis. the measuring member 12 is attached to the lower end of the spindle 26. In FIG. 7, designated at 27 is a casing of the spindle 26.

In this type of three-dimensional coordinate measuring machine, the measuring member 12 is moved in a direction of the Y-axis by moving leg portions 19 and 21 of the measuring member support body 14 along a guide rail 28 fixed on the upper surface of the table 10. Namely, the right leg portion 21 (i.e., Y-axis slider) of the column 20 of the measuring member support body 14 is provided with bearings associated with the upper surface of the guide rail 28, for example, air bearings 30, and with bearings associated respectively with the opposite side surfaces of the guide rail 28, for example, air bearings 32 as shown in FIG. 8. Further, the left leg portion 19 of the column 18 of the measuring member support body 14 is provided with bearings associated with the upper surface 10A of the table 10, for example, air bearings 34 as shown in FIG. 8.

The measuring member 12 is moved in a direction of the X-axis by moving the X-axis slider 24 along the crossmember 22. Furthermore, the measuring member 12 is moved in a direction of the Z-axis by vertically moving the spindle 26 relative to the X-axis slider 24.

A main scale 36 of a Y-axis encoder 36 is fixed to the guide rail 28. The Y-axis encoder 36 detects the displacement of the measuring member 12 along the Y-axis with the movement of the measuring member support body 14 along the guide rail 28. A main scale 38 of an X-axis encoder 38 is fixed to the crossmember 22, and the displacement of the measuring member 12 along the X-axis with the movement of the X-axis slider 24 is detected by the X-axis encoder 38. The displacement of the measuring member 12 along the Z-axis by the vertical movement of the spindle 26 is detected by a Z-axis encoder 40 attached to the casing 27 (X-axis slider 24).

Thus, size and shape of the work fixedly placed on the upper surface 10A of the table 10 can be measured by moving the measuring member 12 in contact with the surface of the work in three dimensional directions.

In this type of three-dimensional coordinate measuring machine, the measuring member support body 14 is guided while moving along the Y-axis by the opposite side surfaces and the upper surface of the guide rail 28 provided on one end of the upper surface 10A of the table 10, and by the other end of the upper surface 10A of the table 10 as schematically shown in FIG. 8.

However, this conventional coordinate measuring machine has such problems as follows: (1) The provision of the guide rail 28 on the upper surface 10A of the table 10 inevitably reduces the effective area on the upper surface 10A for placing a work so that the work to be placed on the table 10 is limited in size. (2) The guide rail 28 is an obstacle to carrying in a work on the table 10, so, in some cases, the work must be tilted before mounting on the table 10. It leads to a hindrance to carrying the work in and out. (3) the provision of the guide rail 28 inevitably increases the height of the measuring member support body 14, hence the total height of the coordinate measuring machine. (4) The guide rail 28 provided on the upper surface 10A of the table 10 is apt to be soiled to make the smooth movement of the measuring member support body 14 difficult.

To solve those problems, UK Patent Application GB No. 2179452A was proposed.

One of the preferred embodiments according to the UK Patent Application is illustrated in FIG. 9. In contrast to the coordinate measuring machine shown in FIG. 7, in the embodiment a stone table 10 having a rectangular longitudinal section and a horizontal upper surface 10A is supported on the base 16 by supporting members 42 with a gap between the lower surface thereof and the upper surface of the base 16; the leg portions (i.e., Y-sliders) 19 and 21 of the measuring member support body 14 are provided with air bearings 30 which are opposite to the upper surface 10A of the table 10 and air bearings 32 which are opposite to the vertical side surfaces 10B and 10C of the table 10; and the leg portions 19 and 21 are interconnected by a connecting member 44 extending across and below the table 10, so that (1) any guide rail need not be provided on the upper surface 10A of the table 10, (2) the measuring member support body 14 is supported on the table 10 not to be inclined or caused to fall down by an external lateral force, and (3) the rigidity of the measuring member support body 14 is enhanced to prevent the expansion of the interval between the columns 18 and 20 of the measuring member support body 14 by air pressure applied to the air bearings.

In FIG. 9, denoted at 46 is a connecting member interconnecting the respective upper ends of the columns 18 and 20 of the measuring member support body 14.

In the coordinate measuring machine shown in FIG. 9, the measuring member support body 14 is guided while moving along the Y-axis by the horizontal upper surface 10A and opposite vertical side surfaces 10B and 10C of the table 10, as schematically shown in FIG. 10. Therefore, the side surfaces 10B and 10C having a wide span therebetween prevents the yaw of the measuring member support body 14.

FIG. 11 shows another embodiment according to the UK Patent Application GB No. 2179452A. This coordinate measuring machine comprises a table 10 having flat surfaces on a lower surface 10D extending in parallel to the upper surface 10A at the opposite ends thereof with respect to the X-axis, a guide rail 48 having two opposite vertical surfaces extending in the direction of the Y-axis is parallel to the Z-axis, attached to the lower surface 10D substantially at the middle thereof, the air bearings 30 provided on the leg portions 19 and 21 so as to be associated with the upper surface 10A of the table 10, air bearings 50 provided on the leg portions 19 and 21 opposite to the air bearings 30 so as to be associated with the flat surfaces formed on the lower surface 10D of the table 10, the air bearings 32 provided on the connecting member 44 interconnecting the leg portions 19 and 21 so as to be associated with the vertical surfaces of the guide rail 48, and the measuring member support body 14 movable relative to the table 10 along the Y-axis. Thus, the measurement error due to the tilt of the measuring member support body 14 is eliminated.

In this coordinate measuring machine shown in FIG. 11, as schematically shown in FIG. 12, the measuring member support body 14 is guided while moving along the Y-axis by the respective opposite ends of the upper surface 10A and lower surface 10D of the table 10, and by the opposite vertical surfaces of the guide rail 48, the rolling of the measuring member support body 14 is prevented by the respective opposite ends of the upper surface 10A and lower surface 10D of the table 10, and the yaw of the measuring member support body 14 is prevented by the opposite vertical surfaces of the guide rail 48 provided at the middle of the lower surface 10D of the table 10 having a narrow span between the opposite vertical surfaces.

However, in both of the foregoing prior arts, the rigidity of the measuring member support body 14 is enhanced to prevent the expansion of the interval between the columns 18 and 29 of the measuring member support body 14 due to air pressure applied to the air bearings, and the measuring member support body 14 is connected by the connecting member 44 extending across and under the table 10 to prevent the tilt of the columns 18 and 20. Accordingly, such a coordinate measuring machine requires additional parts. It leads to an increase in weight, difficulty in machining and assembling works of the parts, and higher price.

Furthermore, the coordinate measuring machine has a built-up construction, the table 10 must be solid to secure measuring accuracy. In contrast thereto, the measuring member support body 14 must be easy to operate and able to move accurately at a high speed. Therefore, the required material quality of the table 10 is usually different from that of measuring member support body 14, namely, the table 10 must be high in rigidity and low in thermal deformation, while the measuring member support body 14 must be lightweight furtheremore. Accordingly, in most cases, the table 10 is formed of stone, and the measuring member support body 14 is formed of cast aluminum and/or steel. However, problems arise in the coordinate measuring machine due to difference between those materials in thermal expansion coefficient. For example, the respective thermal expansion coefficients of aluminum, steel and stone are $22\times10^{-6}$ m/deg, $11\times10^{-6}$ m/deg and $8\times10^{-6}$ m/deg. Consequently, the clearance between the measuring member support body 14 and the table 10 varies according to the difference between the table 10 and the long connecting member 44 in thermal expansion coefficient, due to the variation of the ambient temperature, namely, the clearance increases as the ambient temperature rises and decreases as the ambient temperature drops, and thereby the bearing clearance is caused to vary, particularly, when air bearings are employed, from an appropriate bearing clearance for highly accurate movement of the measuring member support body 14. Therefore, an appropriate mobility cannot be maintained.

Still further, the total height of the coordinate measuring machine is inevitably increased because a wide space must be secured between the lower surface of the table 10 and the upper surface of the base 16 to extend the heavy connecting member 44 across and under the table 10.

SUMMARY OF THE INVENTION

The present invention was developed to obviate the above described disadvantages and drawbacks of the prior art. Accordingly, it is an object of the present invention to provide a coordinate measuring machine, which is capable of avoiding falling down of the measuring member support body without requiring any connecting member to be extended across and under the table to interconnect the opposite lower ends thereof, and capable of guiding the measuring member support body along the Y-axis at high accuracy.

To achieve the above-described object, the present invention contemplates that, in a coordinate measuring machine comprising a table having an upper surface for placing a work thereon, a measuring member support body crossing over the table and capable of moving relative to the table and a measuring member supported on the measuring member support body, for measuring size and shape of the work from the displacement of the measuring member, which is moved in multidimensional directions and contacted with the work placed on the table, further comprising;

a Y-axis guide section which is formed at one lateral end of the table, and which has a first lower flat guide surface in parallel to the upper surface of the table, and two parallel vertical guide surfaces formed on the opposite sides of the first lower flat guide surface so as to extend along the direction of the movement of the measuring member support body;

a second lower flat guide surface which is formed at the other lateral end of the table in parallel to the upper surface of the table;

means for regulating the vertical position of the measuring member support body relative to the table provided on the leg portion of the column of the measuring member support body on the side of the Y-axis guide section so as to be associated with the upper surface of the table and the first lower flat guide surface of the Y-axis guide section;

means for regulating the horizontal position of the measuring member support body relative to the lateral direction of the table provided on the leg portion of the column of the measuring member support body on the side of the Y-axis guide section so as to be associated with the two parallel vertical guide surfaces of the Y-axis guide section; and means for regulating the vertical position of the measuring member support body relative to the table provided on the leg portion of the column of the measuring member support body on a side opposite to the Y-axis guide section so as to be associated with the upper surface of the table and the second lower flat guide surface.

The coordinate measuring machine according to the present invention thus constructed has a narrow guide which consists of (1) the Y-axis guide section with narrow span between the two parallel vertical guide surfaces, which is formed at one lateral end of the table along the X-axis and which has the first lower flat guide surface in parallel to the upper surface of the table so as to extend along the direction (the Y-axis) of movement of the measuring member support body, and the two parallel vertical guide surfaces formed on the opposite sides of the first lower flat guide surface so as to extend along the Y-axis, and (2) means for regulating the vertical position, namely, the position in the direction of the Z-axis, of the measuring member support body relative to the table associated with the upper surface of the table and the first lower flat guide surface, and means for regulating the horizontal position of the measuring member support body relative to the lateral direction (along the Y-axis) of the table, associated with the two parallel vertical guide surfaces. Accordingly, the rigidity of the measuring member support body can be enhanced without using a connecting member which, in the known coordinate measuring machine, is extended across and under the table.

Further, the second lower flat guide surface is formed at the other lateral end of the table in parallel to the upper surface of the table, and the vertical position regulating means of the measuring member support body relative to the table is provided on the side opposite to the Y-axis guide section so as to be associated with the second lower flat guide surface and the upper surface of the table. Accordingly, the rolling of the measuring member support body can be avoided.

Furthermore, the bearing pressure of the air bearings does not have any power component to tilt the columns of the measuring member support body. Accordingly, the measuring member support body is able to operate for highly accurate measurement without being provided with any connecting member to be extended across and under the table to interconnect the respective lower ends of the columns of the measuring member support body. Therefore, the number of parts is reduced, increase in weight of the coordinate measuring machine is prevented, machining and assembling work of the parts is facilitated, and the coordinate measuring machine can be constructed at a low cost.

Further, the tilt and fall of the measuring member support body can be prevented, and the coordinate measuring machine can be mounted easily on the base.

Furthermore, the measuring member support body is able to travel at a high accuracy regardless of the variation of the ambient temperature because the function of the position regulating means is affected insignificantly by an effect of difference in thermal expansion coefficient between the table and the measuring member support body. When air bearings are employed, in particular, the measuring member support body is able to maintain appropriate mobility regardless of the variation of the ambient temperature and, since the columns of the measuring member support body are prevented from tilting by the air pressure of the air bearings, the measuring member support body is able to travel for accurate measurement. Moreover, the coordinate measuring machine can be constructed in a low height and provides a sufficient space for receiving the work.

In case each of the two parallel vertical guide surfaces of the Y-axis guide section are formed respectively in one side surface of the table itself and in an inner side surface, which is closer to the side surface of the table, of a groove formed in the lower surface of the table, the side surface of the table can be used as a guide. Then forming and finishing the vertical guide surface can be facilitated.

In case the first lower flat guide surface of the Y-axis guide section is formed in the lower surface of the table itself, forming and finishing the first lower flat guide surface can be facilitated and highly accurate guiding is ensured.

In case each of the two parallel vertical guide surfaces of the Y-axis guide section are formed respectively in the opposite side surfaces of a guide member provided on the lower surface of the table, a groove need not be formed in the table and the guide surfaces can easily be finished.

In case the first lower flat guide surface of the Y-axis guide section is formed in the lower surface of the guide member, finishing the first lower flat guide surface can be facilitated.

In case the two parallel vertical guide surfaces of the Y-axis guide section are formed respectively in the opposite vertical inner surfaces of a groove formed in the lower surface of the table so as to extend along the Y-axis, the bearings for restraining the measuring member support body from lateral movement along the X-axis relative to the table can be placed within the width of the table. Then the total width of the coordinate measuring machine can be reduced.

In case the first lower flat guide surface of the Y-axis guide section is formed in the horizontal inner surface of the groove formed in the lower surface of the table, the bearings for restraining the measuring member support body from vertical movement along the Z-axis relative to the table can be placed within the height of the table.

In case air bearings are used as the position regulating means, noncontact guiding can be achieved.

BRIEF DESCRIPTION OF THE DRAWINGS

The exact nature of this invention, as well as other objects and advantages thereof, will be readily apparent from consideration of the following specification relating to the accompanying drawings, in which reference characters designate the same or similar parts throughout the figures thereof and wherein:

FIG. 2 is a side elevation view of the coordinate measuring machine of FIG. 1;

FIG. 3 is an enlarged fragmentary sectional view around an X-axis encoder incorporated in the coordinate measuring machine of FIG. 1;

DESCRIPTION OF THE PREFERRED EMBODIMENT

The present invention will be described in detail with reference to the accompanying drawings which illustrate preferred embodiments of the present invention.

Figure 1:
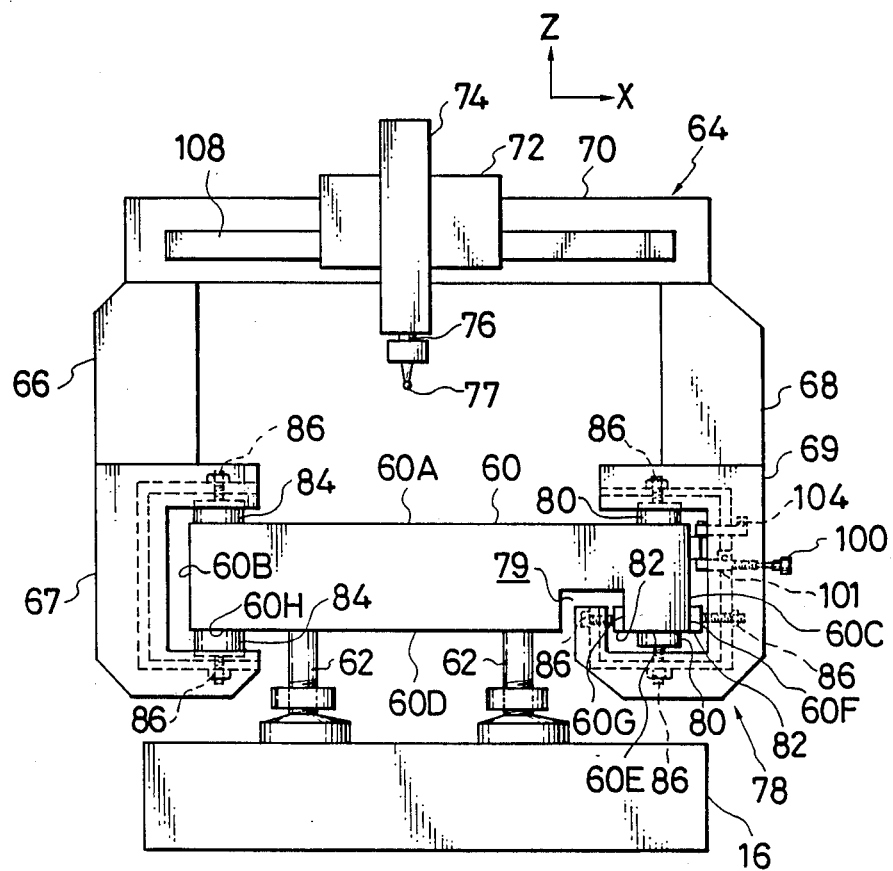
FIG. 1 is a front elevation view of a coordinate measuring machine, in a first embodiment, according to the present invention.

FIG. 1 shows a front elevation view of a first embodiment according to the present invention and FIG. 2 shows a side elevation view thereof.

In the first embodiment, a table 60 is a stone surface plate formed of stone. The lower surface 60D of the table 60 is provided with three supporting members 62. The table 60 is supported on a base 16 by the supporting members 62 with a small gap therebetween. Since no connecting member is extended across and under the table 60, the optimum number of supporting members 62, for example three as in the first embodiment, may be placed at optimum positions, for example, at positions respectively corresponding to the vertices of a triangle for efficiently and accurately supporting the table 60. Supporting a table in this way obviates the action of an excessive force on the table, particularly in the central portion of the table more effectively as compared with the way, in which the table is supported at four positions in the both end portions of the table, employed in the conventional coordinate measuring machine having a connecting member extended across and under the table.

Referring to FIG. 1, a bridge-shaped measuring member support body 64 has a left column 66 and a right column 68. A crossmember 70 is extended horizontally between the respective upper ends of the columns 66 and 68. An X-axis slider 72 is slidably mounted on the crossmember 70. A spindle 76 is supported movably in the vertical direction, namely, along the Z-axis in a casing 74 formed integrally with the X-axis slider 72.

The lower end of the spindle 76 is projected from the lower surface of the casing 74, and a measuring member 77 is attached to the lower end of the spindle 76.

A left leg portion 67 and a right leg portion 69, which comprise Y-axis sliders, are provided at the respective lower ends of the column 66 and 68 of the measuring member support body 64.

A Y-axis guide section 78 is formed in the lower surface 60D of the table 60 at one lateral end with respect to the X-axis, namely, at the right-hand end as viewed in FIG. 1. The Y-axis guide section has a first lower flat guide surface 60E parallel to the upper surface 60A of the table 60, and two parallel vertical guide surfaces 60F and 60G formed on the opposite sides of the first lower flat guide surface 60E so as to extend along the direction of movement of the measuring member support body 64, namely, along the Y-axis.

The vertical guide surface 60F is formed in the side surface 60C of the table 60 itself, and the vertical guide surface 60G is formed in the inner side surface closer to the side surface 60C (on the right side as viewed in FIG. 1) of a groove 79. The groove 79 is formed in the lower surface 60D of the table 60. The side surface 60C of the table 60 having the upper surface 60A accurately finished in a horizontal flat plane can be used as a guide. It leads to easy forming and finishing the vertical guide surface 60F. Furthermore, since the groove 79 whose depth is comparatively shallow is sufficient, the groove 79 will not affect adversely to the rigidity of the table 60. Therefore, sufficient guiding accuracy can be obtained.

A second lower flat guide surface 60H which is parallel with the upper surface 60A of the table 60 is formed on the other side with respect to the X-axis (on the left side as viewed in FIG. 1) in the lower surface 60D itself of the table 60. Therefore, the second lower flat guide surface 60H can easily be formed and finished for highly accurate guiding.

The right leg portion 69 on the side of the Y-axis guide section 78 of the measuring member support body 64 is provided with three air bearings in all, namely, two air bearings 80 associated with the upper surface 60A of the table 60, and one air bearing 80 associated with the first lower flat guide surface 60E to regulate the vertical position (the position with respect to the Z-axis) of the right leg portion 69 relative to the table 60.

The right leg portion 69 is provided also with four air bearings in all, namely, two air bearings 82 respectively associated with the vertical guide surface 60F and 60G to regulate the lateral position (the position with respect to the X-axis) of the measuring member support body 64 relative to the table 60.

The left leg portion 67 on the side opposite to the Y-axis guide section 78 of the measuring member support body 64 is provided with three air bearing in all, namely, two air bearings 84 associated with the upper surface 60A of the table 60, and one air bearing 84 associated with the second lower flat guide surface 60H to regulate the vertical position (the position with respect to the Z-axis) of the left leg portion 67 relative to the table 60.

The air bearings 80, 82 and 84 are held on the corresponding leg portions 67 and 69 of the measuring member support body 64 with adjusting screws 86 each having a semispherical end, for adjusting the bearing clearance to an optimum value, respectively.

Referring to FIG. 2, denoted at 90 is a main scale of a Y-axis optical encoder for detecting the displacement of the measuring member support body 64 along the Y-axis. The main scale 90 is screwed to the side surface of the table 60 through scale holder 92. A detector 94 of the Y-axis optical encoder is screwed to the right leg portion 69 of the measuring member support body 64. In the detector 94, an index scale associated with the main scale 90, a light emitting element, light receiving elements and the like are stored.

Accordingly, the light emitted from the light emitting element is converted by the main scale 90 and the index scale into optical signals, received by the light receiving elements, and then converted into electric signals indicating the value of the movement of the measuring member support body 64, hence the displacement of the measuring member 77, along the Y-axis relative to the table 60.

Referring to FIG. 3, the posture of the detector 94 relative to the main scale 90 is adjusted correctly by an adjusting screw 95 to eliminate measurement errors due to a tilt of the detector 94 relative to the main scale 90. The detector 94 is described in detail in the UK Patent Application GB No. 2179452A and hence the further description thereof will be omitted.

Referring again to FIG. 2, a stopper 96 including compression coil springs on both ends are screwed to the right leg portion 69 of the measuring member support body 64. The reciprocal action of the stopper 96 and stopper bolts 98 respectively provided near the opposite longitudinal ends of the side surface 60C of the table 60 limits the movement of the measuring member support body 64 along the Y-axis.

Referring to FIGS. 1 and 2, a fixing screw 100 is provided on the right leg portion 69 of the measuring member support body 64. The fixing screw 100 is used to stop a relative movement between the measuring member support body 64 and the table 60 and to fix the relative position therebetween for precision measurement.

Furthermore, a fine adjustment mechanism 102 comprising a micrometer screw head 104 and a parallel spring 106 is provided on the right leg portion 69 of the measuring member support body 64. An inverse L-shaped link 101 rotated by the fixing screw 100 is pressed against the lower surface of the scale holder 92 to fix the relative position between the measuring member support body 64 and the table 60, and then the micrometer screw head 104 can be operated for fine adjustment.

An X-axis optical encoder having a main scale 108 and the same constitution as that of the Y-axis optical encoder is provided on the crossmember 70. The displacement of the measuring member 77 along the X-axis due to the movement of the X-axis slider 72 along the crossmember 70 is detected by the X-axis optical encoder.

A Z-axis optical encoder having the same constitution as that of the Y-axis optical encoder is provided on the X-axis slider 72. The displacement of the measuring member 77 along the Z-axis due to the vertical movement of the spindle 76 relative to the X-axis slider 72 is also detected by the Z-axis optical encoder.

Figures 4, 5:
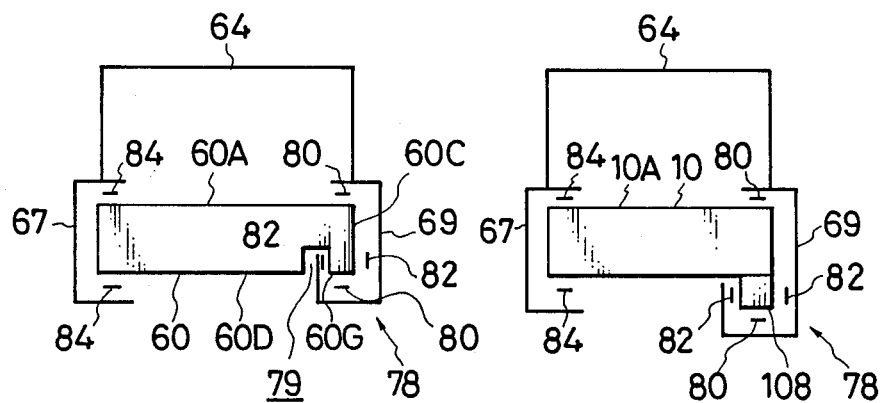
FIG. 4 is a diagrammatic illustration showing the basic constitution of the coordinate measuring machine of FIG. 1.
FIG. 5 is a diagrammatic illustration showing the basic constitution of a coordinate measuring machine, in a second embodiment, according to the present invention.

FIG. 4 shows the basic constitution of the guide arrangement of the first embodiment for guiding the measuring member support body 64 for movement along the Y-axis. The position of the measuring member support body 64 with respect to the X-axis is regulated by the side surface 60C of the table 60 itself, and the inner side surface 60G of the groove 79 formed in the lower surface 60D of the table 60. Accordingly, the measuring member support body 64 can be guided without adversely affecting the rigidity thereof. Since the position of the measuring member support body 64 with respect to the Z-axis is guided by portions on the opposite ends of the upper and lower surfaces of the table 60, the guiding structure is simple and the measuring member support body 64 is effectively prevented from rolling.

A coordinate measuring machine, in a second embodiment, according to the present invention will be described hereinafter in detail. FIG. 5 shows the basic constitution of the guide arrangement of the second embodiment for guiding the measuring member support body 64 for movement along the Y-axis.

In the second embodiment, a guide rail 108 is attached to one lateral end with respect to the X-axis of the lower surface of the table 10. The position of the measuring member support body 64 with respect to the X-axis is regulated by the air bearings 82 so as to be associated with the opposite outer (vertical) side surfaces of the guide rail 108. The position of the measuring member support body 64 with respect to the Z-axis is regulated by the air bearings 80 so as to be associated with the upper surface 10A of the table 10 on the lateral (right) end having the guide rail 108 and the lower surface of the guide rail 108 and by the air bearings 84 so as to be associated with the upper and lower surfaces of the table 10 on the other lateral (left) end.

In the second embodiment, the table 10 need not be provided with any groove in the lower surface thereof. The guide rail 108 may be formed integrally with the table 10.

Other components and constitution of the second embodiment are the same as those of the first embodiment, and hence the description thereof will be omitted.

Figure 6:
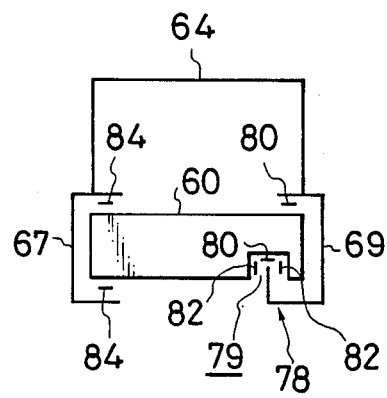
FIG. 6 is a diagrammatic illustration showing the basic constitution of a coordinate measuring machine, in a third embodiment, according to the present invention.
Figure 7:
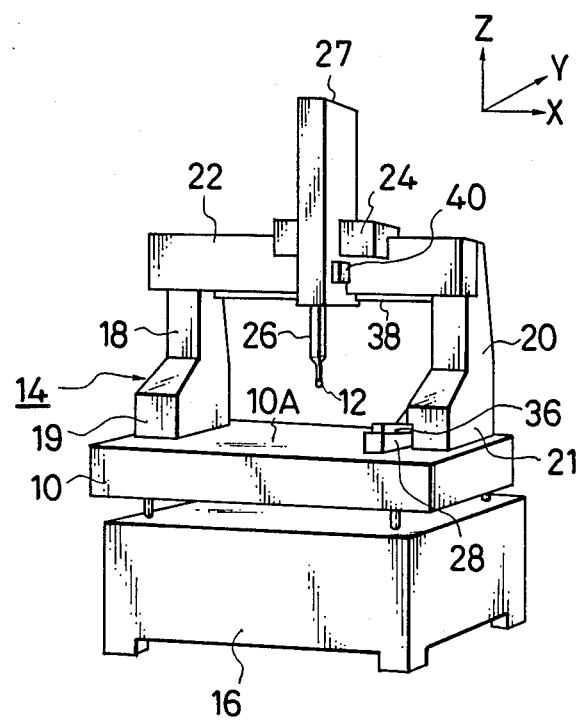
FIG. 7 is a perspective view of a conventional coordinate measuring machine.
Figure 8:
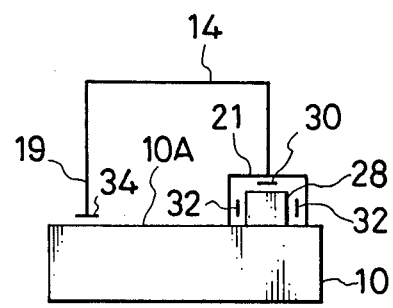
FIG. 8 is a diagrammatic illustration showing the basic constitution of the coordinate measuring machine of FIG. 7.
Figures 9, 10:
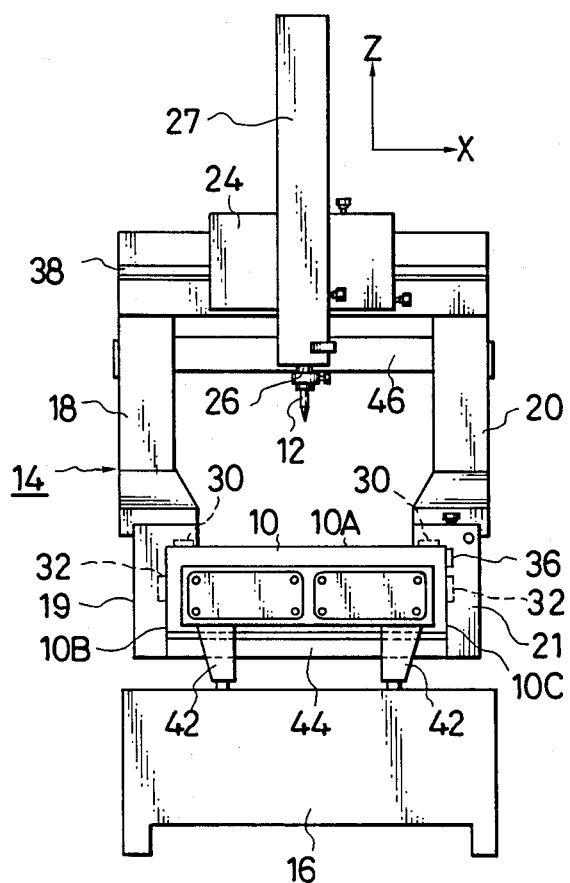
FIG. 9 is a front elevation view showing one example of a coordinate measuring machine disclosed in the UK Patent Application GB No. 2179452A.
FIG. 10 is a diagrammatic illustration showing the basic constitution of the coordinate measuring machine of FIG. 9.
Figure 11:
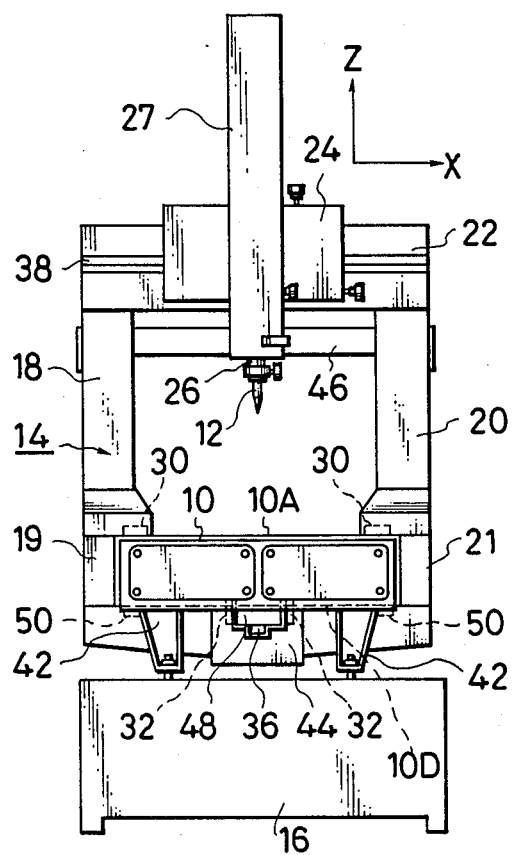
FIG. 11 is a front elevation view showing another example of a coordinate measuring machine disclosed in the UK Patent Application GB No. 2179452A.
Figure 12:
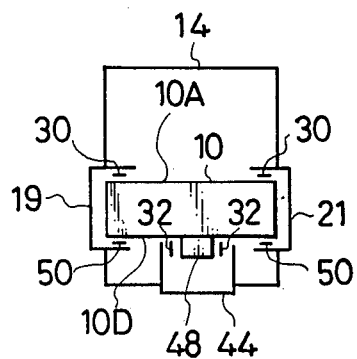
FIG. 12 is a diagrammatic illustration showing the basic constitution of the coordinate measuring machine of FIG. 11.

A coordinate measuring machine, in a third embodiment, according to the present invention will be described hereinafter in detail. FIG. 6 shows the basic constitution of the guide arrangement of the third embodiment for guiding the measuring member support body 64 for movement along the Y-axis.

In the third embodiment, the groove 79 similar to that of the first embodiment is formed in the lower surface of the table 60. The position of the measuring member support body 64 with respect to the X-axis is regulated by the air bearings 82 so as to be associated with the opposite inner (vertical) side surfaces of the groove 79. The position of the measuring member support body 64 with respect to the Z-axis is regulated by the air bearings 80 so as to be associated with the upper surface of the table 60 on the lateral (right) end having the groove 79 and the inner upper (horizontal) surface of the groove 79 itself.

In the third embodiment, all the bearings 82 for regulating the position of the measuring member support body 64 with respect to the X-axi are placed within the width of the table 60, thereby the coordinate measuring machine can be formed in a reduced width.

Other components and constitution of the third embodiment are the same as those of the first embodiment, and hence the description thereof will be omitted.

Although each foregoing embodiment of the present invention employs air bearings for regulating the positions of the measuring member support body 64, means for regulating the positions of the measuring member support body 64 need not be limited thereto, and any optional means such as roller bearings, may be employed. More specifically, any means capable of regulating the position of the measuring member support body 64 relative to the table and allowing the measuring member support body to move along the guide arrangement can be used.

Further, the encoders for detecting X-, Y-, Z-axis displacements are not limited to the optical encoders as shown, but any suitable encoders, such as magnetic encoders or electrical capacitance encoders, may be employed.

Although, in the foregoing embodiments, the measuring member 77 is moved relative to the fixed table, the present invention is not limited thereto in its application. The present invention may be applied to a coordinate measuring machine of any type in which the table and the measuring member are movable relative to each other, for example, a coordinate measuring machine in which the table is moved relative to the fixed measuring member.

Furthermore, although the present invention has been described as applied to a three-dimensional coordinate measuring machine, obviously the present invention is applicable also to a two-dimensional coordinate measuring machine in which the measuring member moves in two-dimentional directions within a plane parallel to the upper surface of a table.

What is claimed is:

1. A coordinate measuring machine comprising a table having an upper surface for placing a work thereon; a measuring member support body crossing over the table and capable of moving relative to the table; and a measuring member supported on the measuring member support body for measuring size and shape of the work from the displacement of the measuring member which is moved in multidimensional directions and contacted with the work placed on the table, comprising;

a Y-axis guide section which is formed at one lateral end of the table and which has a first lower flat guide surface in parallel to the upper surface of the table, and two parallel vertical guide surfaces formed on the opposite sides of the first lower flat guide surface so as to extend along the direction of movement of the measuring member support body;

a second lower flat guide surface which is formed at the other lateral end of the table in parallel to the upper surface of the table;

means for regulating the vertical position of the measuring member support body relative to the table, provided on a leg portion of a column of the measuring member support body on the side of the Y-axis guide section so as to be associated with the upper surface of the table and the first lower flat guide surface of the Y-axis guide section;

means for regulating the horizontal position of the measuring member support body relative to the lateral direction of the table, provided on the leg portion of the column of the measuring member support body on the side of the Y-axis guide section so as to be associated with the two parallel vertical guide surfaces of the Y-axis guide section; and means for regulating the vertical position of the measuring member support body relative to the table, provided on a leg portion of a column of the measuring member support body on a side opposite to the Y-axis guide section so as to be associated with the upper surface of the table and the second lower flat guide surface.

2. The coordinate measuring machine as set forth in claim 1, wherein each of the two parallel vertical guide surfaces of said Y-axis guide section are formed respectively in one side surface of said table itself and in an inner side surface, which is closer to the side surface of said table, of a groove formed in the lower surface of said table.

3. The coordinate measuring machine as set forth in claim 1, wherein the first lower flat guide surface of said Y-axis guide section is formed in the lower surface of said table itself.

4. The coordinate measuring machine as set forth in claim 1, wherein each of the two parallel vertical guide surfaces of said Y-axis guide section are formed respectively in the opposite side surfaces of a guide member provided on the lower surface of said table.

5. The coordinate measuring machine as set forth in claim 4, wherein the first lower flat guide surface of said Y-axis guide section is formed in the lower surface of said guide member.

6. The coordinate measuring machine as set forth in claim 1, wherein the two parallel vertical guide surfaces of said Y-axis guide section are formed respectively in the opposite vertical inner surfaces of a groove formed in the lower surface of said table so as to extend along the Y-axis.

7. The coordinate measuring machine as set forth in claim 6, wherein the first lower flat guide surface of said Y-axis guide section is formed in the horizontal inner surface of said groove.

8. The coordinate measuring machine as set forth in claim 1, wherein said first and second vertical position regulating means and said horizontal position regulating means are air bearings.

* * * * *